Patented June 23, 1942

2,287,464

UNITED STATES PATENT OFFICE 2,287,464

PREPARATION OF AMINOMETHYL ETHERS

Louis H. Bock, Glenside, Pa., assignor to Röhm & Haas Company, Philadelphia, Pa.

No Drawing. Application March 26, 1940, Serial No. 326,047

7 Claims. (Cl. 260—584)

This invention concerns an improved method for the preparation of tertiary aminomethyl ethers of primary and secondary alcohols. By this procedure there may be made not only the aminomethyl ethers of the primary short-chain alcohols which have been previously synthesized but also ethers of the intermediate- and long-chain alcohols of both primary and secondary structure. The aminomethyl ethers of primary alcohols of more than five carbon atoms, the preparation of which has not been practical by methods heretofore available, may be made according to the new method in satisfactory yield. By this method there are also readily obtained the aminomethyl ethers of secondary alcohols.

It is an object of this invention to provide an improved method for the preparation of tertiary aminomethyl ethers of primary and secondary alcohols. It is another object to provide a means for making such ethers of intermediate- and long-chain alcohols with satisfactory yield.

The ethers of this invention are prepared by reacting a primary or secondary alcohol with anhydrous formaldehyde and a non-aromatic ditertiary methylene diamine, usually in an organic solvent. The reaction proceeds according to the following equation:

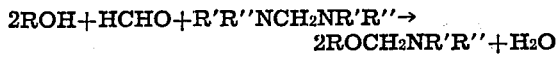

wherein ROH represents a primary or secondary alcohol and R′ and R″ represent non-aromatic hydrocarbon groups which may be identical or different or which, when taken together as a divalent group, form a heterocycle with the nitrogen atom.

The water formed according to the above equation is removed as the reaction proceeds. This may be done with absorbents but is most conveniently accomplished by heating the reaction mixture under reflux in an inert water-immiscible solvent and separating the water by means of a trap. The water which may be taken off usually corresponds to the theoretical amount. It generally contains a little formaldehyde and some of the secondary amine which was used in preparing the methylene diamine. The yield can be improved by the use of excess of formaldehyde and/or methylene diamine, but the success of the reaction is not dependent upon such excess.

The methylene diamines which are useful in this invention are obtainable by reacting formaldehyde and an aliphatic, alicyclic or heterocyclic secondary amine, such as dimethylamine, diethylamine, diisobutylamine, diallylamine, benzylmethylamine, methyl cyclohexylamine, methyl caprylamine, morpholine, piperidine, pyrrolidine, or the like. The reaction of formaldehyde and non-aromatic secondary amine leads to the formation of compounds of the general formula

which are conveniently termed "non-aromatic tetrasubstituted methylene diamines," by which expression there are designated amines in which there is no linkage of nitrogen directly to a phenyl or other aromatic ring but to an aliphatic, alicyclic or heterocyclic radical.

To supply anhydrous formaldehyde, it is usually most desirable to use paraformaldehyde, by which term is meant the usual solid polymers of formaldehyde which are found in commerce. The polymers vary in molecular size and include trioxymethylene and other polyoxymethylenes. As is well known, the polymers are equivalent to monomeric formaldehyde in their usual reactions since they yield formaldehyde. There may also be used gaseous or a non-aqueous solution of formaldehyde, particularly when the reaction is conducted in a closed vessel or under pressure.

The alcohols which are useful comprise all types of primary and secondary alcohols. The alcohols may be aliphatic, cycloaliphatic, arylaliphatic, aliphatic aralkyl, etc. Typical of these alcohols are the following:

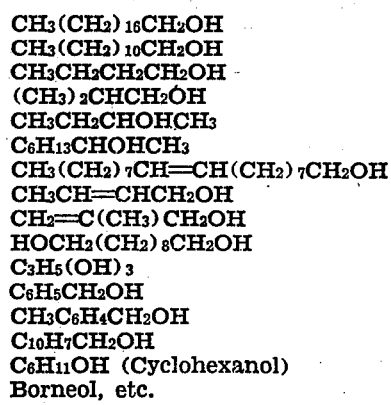

When the reaction is carried out by heating under reflux, there is used an inert, water-immiscible solvent, such as a petroleum ether, naphtha, benzene, toluene, higher alcohols, etc.

The reaction between a methylene diamine, formaldehyde, and a primary or secondary alcohol is illustrated by the following examples.

Example 1

To 253 parts of a mixture of cetyl and octadecyl alcohols, obtained from the reduction and fractionation of coconut oil and having an apparent molecular weight of 253 as determined by hydroxyl number, was added 200 parts of petroleum ether, B. P. 55–100° C., 62 parts of tetramethyl methylene diamine and 22.5 parts of paraformaldehyde. The mixture was stirred and refluxed in an apparatus having a trap attached to the condenser for removing water. 10.6 parts of water was obtained in three hours. The solvent was removed from the product by evaporation under partial vacuum. The product was a clear liquid at room temperature. Yield 315 parts. Titration of a sample with standard acid gave an apparent molecular weight of 356.

Example 2

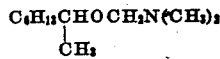

A mixture composed of 65 parts of capryl alcohol, 150 parts of petroleum ether, 27 parts of tetramethyl methylene diamine and 7.5 parts of paraformaldehyde was treated as in Example No. 1. 3.9 parts of water was obtained. The product was distilled, B. P. 118° C./63 mm.–128° C./60 mm. Yield 76.5 parts.

Example 3

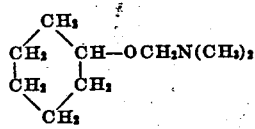

100 parts of cyclohexanol, 150 parts of petroleum ether, 15 parts of paraformaldehyde and 52 parts of tetramethyl methylene diamine were reacted as in Example No. 1. The reaction was complete in 2½ hours. The product was distilled, B. P. 104–109 C./66 mm. Yield 103.5 parts.

Example 4

42 parts of decamethylene glycol, 150 parts of petroleum ether, 27 parts of tetramethyl methylene diamine and 7.5 parts of paraformaldehyde were reacted as in Example No. 1. The product was distilled, B. P. 158° C./2.5–1.5 mm. Yield 61 g. Analysis: N, 9.15%. Theory for $C_{16}H_{36}O_2N_2$, 9.72%.

Example 5

53 parts of oleyl alcohol, 150 parts of petroleum ether, 10.5 parts of tetramethyl methylene diamine and 3 parts of paraformaldehyde were reacted as in Example No. 1. 1.9 parts of water was obtained in three hours. The solvent was evaporated, leaving a product which gave on analysis N, 3.81%. The theory for $C_{21}H_{43}ON$ is N, 4.31%.

Example 6

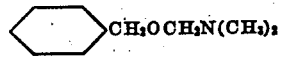

54 parts of benzyl alcohol, 150 parts of petroleum ether, 27 parts of tetramethyl methylene diamine and 7.5 parts of paraformaldehyde were reacted as in Example No. 1. The product was distilled, B. P. 100° C./16 mm.–96° C/10 mm. Yield 70 parts.

Example 7

135 parts of octadecyl alcohol, 200 parts of petroleum ether, 40 parts of tetraethyl methylene diamine and 7.5 parts of paraformaldehyde were reacted as in Example No. 1. 4 parts of water were obtained. The solvent was removed by evaporation. The product was a low melting solid.

Example 8

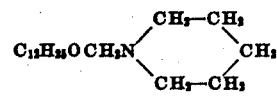

93 parts of dodecyl alcohol, 200 parts of petroleum ether, 46 parts of N,N'-dipiperidinomethane and 7.5 parts of paraformaldehyde were reacted as in Example No. 1. 4.1 parts of water was obtained.

Example 9

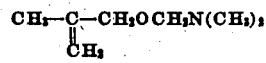

72 parts of methallyl alcohol, 200 parts of isohexane, 15 parts of paraformaldehyde, and 55 parts of tetramethyl methylene diamine were reacted as in Example No. 1. 8.8 parts of water was obtained in three hours. The product was distilled through a fractionating column. B. P. 125–138° C. Yield, 106 parts. Titration of a sample with standard acid gave an apparent molecular weight of 133.

The aminomethyl ethers of primary and secondary alcohols, particularly those having eight or more carbon atoms, are useful in the preparation of assistants for the textile industry. The aminomethyl ethers are of particular interest as intermediates in the preparation of quaternary ammonium compounds. Thus, they may be reacted with one of the usual agents for alkylation such as methyl iodide, ethyl sulfate, benzyl chloride, allyl bromide, etc. to yield quaternary compounds having one oxymethyl group. They may also be reacted with aliphatic oxymethyl halides to form quaternary ammonium salts having two oxymethyl groups, as described in my copending application Serial No. 244,197, filed December 6, 1938, now U. S. Patent No. 2,204,653, issued June 18, 1940.

These various quaternary derivatives vary in stability and reactivity while the tertiary aminomethyl ethers are sensitive to hydrolysis. The quaternary salts are definitely cation-active and possess, when they have a long chain, capillary activity which makes them effective in wetting, penetrating, emulsifying, and cleaning, particularly in acidic solutions. Instability and reactivity render these compounds useful in waterproofing fabric and fixing sizes on fabric.

I claim:

1. A method for preparing tertiary aminomethyl ethers which comprises reacting a mixture of anhydrous formaldehyde, a methylene diamine of the formula

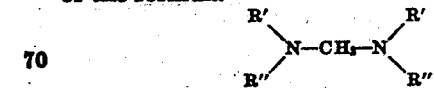

wherein R' and R'' represent members of the group consisting of aliphatic and alicyclic hydrocarbon groups and aralkyl groups when taken individually and when taken together saturated divalent groups which jointly with the nitrogen form a heterocycle, and an alcohol selected from the group consisting of primary and secondary alcohols and removing the water formed in the reaction.

2. A method for preparing tertiary aminomethyl ethers which comprises reacting a mixture of paraformaldehyde, a methylene diamine of the formula

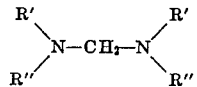

wherein R' and R" represent members of the group consisting of aliphatic and alicyclic hydrocarbon groups and aralkyl groups when taken individually and when taken together saturated divalent groups which jointly with the nitrogen form a heterocycle, and an alcohol selected from the group consisting of primary and secondary alcohols by heating under reflux in an inert, water-immiscible solvent and separating the water formed in the reaction.

3. A method for preparing aminomethyl ethers which comprises reacting a mixture comprising paraformaldehyde, a methylene diamine of the formula

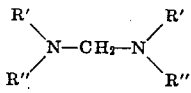

wherein R' and R" represent members of the group consisting of aliphatic and alicyclic hydrocarbon groups and aralkyl groups when taken individually and when taken together saturated divalent groups which jointly with the nitrogen form a heterocycle and a primary alcohol by heating under reflux in an inert, water-immiscible solvent and separating water formed during the reaction.

4. A method for preparing a dimethylaminomethyl ether of an aliphatic alcohol which comprises reacting paraformaldehyde, tetramethyl methylene diamine, and a primary aliphatic alcohol in an inert, water-immiscible solvent by heating under reflux and separating water formed during the reaction.

5. A method for preparing an aminomethyl ether of an alcohol having at least eight carbon atoms which comprises reacting paraformaldehyde, a methylene diamine of the formula

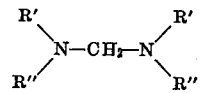

wherein R' and R" represent members of the group consisting of aliphatic and alicyclic hydrocarbon groups and aralkyl groups when taken individually and when taken together saturated divalent groups which jointly with the nitrogen form a heterocycle and an alcohol of at least eight carbon atoms selected from the group of primary and secondary alcohols by heating under reflux said reactants in an inert, water-immiscible solvent and separating the water formed during the reaction.

6. A method for preparing a dimethylaminomethyl ether of a higher aliphatic alcohol which comprises reacting paraformaldehyde, tetramethyl methylene diamine, and a higher aliphatic alcohol by heating under reflux in an inert, water-immiscible solvent and separating the water formed during the reaction.

7. A method for preparing tertiary aminomethyl ethers which comprises reacting a member of the group consisting of anhydrous formaldehyde and polymers of formaldehyde with a diamine of the formula

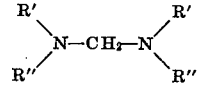

wherein R' and R" represent members of the group consisting of aliphatic and alicyclic hydrocarbon groups and aralkyl groups when taken individually and when taken together saturated divalent groups which jointly with the nitrogen form a heterocycle, and an alcohol selected from the group consisting of primary and secondary alcohols and removing the water formed in the reaction.

LOUIS H. BOCK.